United States Patent [19]

Door

[11] Patent Number: 4,992,126

[45] Date of Patent: Feb. 12, 1991

[54] METHOD FOR MAKING A CURRENT COLLECTOR BONDED TO A SOLID POLYMER MEMBRANE

[75] Inventor: Robert D. Door, West Columbia, Tex.

[73] Assignee: The Dow Chemical Company, Midland, Mich.

[21] Appl. No.: 428,012

[22] Filed: Oct. 25, 1989

Related U.S. Application Data

[63] Continuation of Ser. No. 894,594, Aug. 8, 1986, abandoned, which is a continuation-in-part of Ser. No. 762,222, Aug. 5, 1985, abandoned.

[51] Int. Cl.$^5$ ............................................. B32B 31/00
[52] U.S. Cl. .................................... 156/182; 156/276; 156/309.6; 204/283; 427/203
[58] Field of Search ............... 156/182, 276, 309.6; 204/283; 427/203

[56] References Cited

U.S. PATENT DOCUMENTS

| | | | |
|---|---|---|---|
| 4,293,396 | 10/1981 | Allen et al. | 204/106 |
| 4,389,297 | 6/1983 | Korach | 204/296 |

FOREIGN PATENT DOCUMENTS

| | | |
|---|---|---|
| 228602 | 7/1987 | European Pat. Off. . |
| 55-22971 | 6/1977 | Japan ................................. 156/182 |
| 1435477 | 5/1976 | United Kingdom . |
| 1448904 | 9/1976 | United Kingdom . |
| 2101160A | 1/1983 | United Kingdom . |

*Primary Examiner*—John J. Gallagher

[57] ABSTRACT

The invention is a method of making an ion permeable membrane, electrode and current collector assembly comprising the steps of:
(a) forming a foundation layer comprising a porous electrically conductive material;
(b) at least partially coating a fluoropolymer binder on at least one surface of the conductive foundation layer;
(c) applying a particulate and finely divided catalyst material over the fluoropolymer binder on the foundation layer;
(d) dispersing a suitable polymeric material over the catalyst material in a manner to obtain penetration of the polymeric material into the porous foundation layer to form a substantially continuous coating on the catalyst material and the at least partially coated foundation layer; and
(e) applying sufficient heat and/or pressure to enhance the flow of polymeric material into the foundation layer and around the catalyst material to obtain adherence thereto and to sinter the polymer material into a substantially nonporous layer around the catalyst material.

16 Claims, No Drawings

METHOD FOR MAKING A CURRENT COLLECTOR BONDED TO A SOLID POLYMER MEMBRANE

CROSS REFERENCE TO RELATED APPLICATION

This is a continuation of application Ser. No. 894,594 filed Aug. 8, 1986 now abandoned, which is a continuation-in-part of copending application Serial No. 762,222, filed Aug. 5, 1985, now abandoned.

BACKGROUND OF THE DISCLOSURE

This disclosure is directed to an improved method of manufacturing a current collector/catalyst electrode/membrane assembly which has increased electrical conductivity in the area between the catalyst electrode and the current collector. Such assemblies are useful in a variety of applications including, for example, fuel cells, water electrolysis cells, chlor-alkali cells, and the like. The assembly produced according to the present invention is substantially structurally stable which allows the membrane portion to be substantially thinner than those presently available, and reduces the ionic resistance of the membrane.

It is highly desirable in most uses, given the harsh conditions of many of the applications for the membrane, that the membrane portion of the assembly have substantial structural integrity. Thinner membranes have been viewed as fragile and yet thinner membranes are desirable to reduce ionic resistance. This requires a balance between providing adequate structural support for the assembly on the one hand and yet reducing the membrane's thickness to reduce ionic resistance without it's sacrificing structural integrity.

References which have a bearing on this invention include Pat. No. 4,272,353 which discloses a surface abrading technique for scratching a solid polymer electrolyte (SPE) base member in preparation for subsequent treatment. U.S. Pat. No. 4,272,560 describes a membrane having a cathode made of multiple coatings with a backing fabric. A dissolved copolymer is used in fabrication of this electrode. U.S. Pat. No. 4,182,670 sets forth a combined cathode and diaphragm utilizing a spray coating of a metal substrate with powdered metal. A polymer impregnated diaphragm is also described. An electrode body having impregnated powdered metal (typically noble metals) is set forth in U.S. Pat. No. 3,276,911. It also mentioned a permeable ionic electrolytic material. U.S. Pat. No. 4,364,813 discloses catalytic particles deposited on an ion exchange material with a SPE membrane. This patent has an ion exchange feature mentioning a sulfonic group. U.S. Pat. No. 4,366,041 describes a cathode and diaphragm assembly with a sacrificial film made of wax.

The present disclosure describes a structurally stable electrode assembly which has lower ionic resistance in the membrane portion and which has higher electrical conductivity in the catalyst electrode and current collector portions. Thinness is achieved without sacrifice of structural integrity and yet resistance to ionic movement through the membrane is reduced.

While the foregoing refers in general terms to the present assembly, the structure thereof and the method of manufacture are exemplified in the detailed description of the preferred embodiments following.

SUMMARY OF THE INVENTION

The invention is a method of making an ion permeable membrane, electrode and current collector assembly comprising the steps of:

(a) forming a foundation layer comprising a porous electrically conductive material;

(b) at least partially coating a fluoropolymer binder on at least one surface of the conductive foundation layer;

(c) applying a particulate and finely divided catalyst material over the fluoropolymer binder on the foundation layer;

(d) dispersing a suitable polymeric material over the catalyst material in a manner to obtain penetration of the polymeric material into the porous foundation layer to form a substantially continuous coating on the catalyst material and the at least partially coated foundation layer; and (e) applying sufficient heat and/or pressure to enhance the flow of polymeric material into the foundation layer and around the catalyst material to obtain adherence thereto and to sinter the polymer material into a substantially nonporous layer around the catalyst material.

DETAILED DESCRIPTION OF THE PREFERRED EMBODIMENTS

The foundation layer is an electrically conductive, hydraulically permeable matrix which acts as a current collector to transmit electrical energy to or from the SPE electrode. It may be composed of a variety of substances including carbon cloth, carbon paper, carbon felt, metallic screens, metallic felt, and porous metallic sheets. Preferably, however, the foundation layer is a carbon paper because carbon paper is readily available, performs well, is easily handled, and is relatively inexpensive.

The paper most preferably used in this invention is one having low electrical resistivity, is relatively inexpensive, possesses sufficient strength for fabrication, and have adequate surface properties, such as roughness, to provide good bonding between the fluoropolymer binder and the foundation layer. It is also preferable to provide good electrical contact between the carbon paper and the catalytically active particles of the electrode.

As a beginning step, the foundation layer is at least partially coated with a suitable polymer binder. This polymer binder can be a fluorocarbon such as polytetrafluoroethylene sold under the trademark of Teflon. Other suitable polymers can include thermoplastic, non-ionic forms of sulfonic acid copolymers; thermoplastic, non-ionic forms of carboxylic acid copolymers; and the like.

Particularly preferred as the fluoropolymer binder are thermoplastic, non-ionic forms of perfluorinated polymers described in the following U.S. Pat. Nos.: 3,282,875; 3,909,378; 4,025,405; 4,065,366; 4,116,888; 4,123,336; 4,126,588; 4,151,052; 4,176,215; 4,178,218; 4,192,725; 4,209,635; 4,212,713; 4,251,333; 4,270,996; 4,329,435; 4,330,654; 4,337,137; 4,337,211; 4,340,680; 4,357,218; 4,358,412; 4,358,545; 4,417,969; 4,462,877; 4,470,889; and 4,478,695; European patent application No. 0,027,009. Such polymers usually have equivalent weights of from about 500 to about 2000.

Particularly preferred for use as the fluoropolymer binder are copolymers of monomer I with monomer II (as defined below). Optionally, a third type of monomer may be copolymerized with I and II.

The first type of monomer is represented by the general formula:

$$CF_2=CZZ' \qquad (I)$$

where:

Z and Z' are independently selected from the group consisting of —H, —Cl, —F, or —CF$_3$.

The second monomer consists of one or more monomers selected from compounds represented by the general formula:

$$Y-(CF_2)_a-(CFR_f)_b-(CFR_f')_c-O-[(CF(CF_2X)-CF_2-O]_n-CF=CF_2 \qquad (II)$$

where:

Y is selected from the group consisting of —SO$_2$Z, —CN, —COZ, and —C(R$^3$f)(R$^4$f)OH;

Z is —I, —Br, —Cl, —F, —OR or —NR$_1$R$_2$;

R is a branched or linear alkyl radical having from 1 to about 10 carbon atoms or an aryl radical;

R$^3$f and R$^4$f are independently selected from the group consisting of perfluoroalkyl radicals having from 1 to about 10 carbon atoms;

R$_1$ and R$_2$ are independently selected from the group consisting of —H, a branched or linear alkyl radical having from 1 to about 10 carbon atoms or an aryl radical;

a is 0-6;

b is 0-6;

c is 0 or 1;

provided a+b+c is not equal to 0;

X is —Cl, —Br, —F or mixtures thereof when n>1;

n is 0 to 6; and

R$_f$ and R$_f'$ are independently selected from the group consisting of —F, —Cl, perfluoroalkyl radicals having from 1 to about 10 carbon atoms and fluorochloroalkyl radicals having from 1 to about 10 carbon atoms.

Particularly preferred is when Y is —SO$_2$F or or —COOCH$^3$; n is 0 or 1; R$_f$ and R$_f'$ are —F; X is —Cl or —F; and a+b+c is 2 or 3.

The third and optional monomer suitable is one or more monomers selected from the compounds represented by the general formula:

$$Y-(CF_2)_a-(CFR_f)_b-(CFR_f')_c'-O-[CF(CF_2X')-CF_2-O]_n-CF=CF_2 \qquad (III)$$

where:

Y' is —F, —Cl or —Br;

a' and b' are independently 0-3;

c' is 0 or 1;

provided a'+b'+c' is not equal to 0;

n' is 0-6;

R$_f$ and R'$_f'$ are independently selected from the group consisting of —Br, —Cl, —F, perfluoroalkyl radicals having from 1 to about 10 carbon atoms, and chloroperfluoroalkyl radicals having from 1 to about 10 carbon atoms; and X' is —F, —Cl, —Br, or mixtures thereof when n'>1.

The binder is typically applied in a solution or dispersion to at least partially coat the foundation layer. The solution or dispersion of binder can be applied to the foundation layer using a variety of methods well known in the art. The binder is applied in a manner so that it covers at least a portion of the foundation layer.

When the SPE is to be used in a fuel cell, preferably the binder is a hydrophobic material like polytetrafluoroethylene. When, however, the SPE is to be used in an electrolytic cell, such as a chlor-alkali cell, the binder is preferably a hydrophilic material like the copolymers formed from monomers I, II and, optionally III (described above).

The preferred loading of the binder is between about 0.50 and about 50 mg binder/cm$^2$ of foundation area with a preferred range of from about 2.5 to about 30 m binder/cm$^2$ of foundation area.

When the binder is to be applied as a solution or a dispersion, the solvent/dispersant can be a variety of materials including, for example, water, methanol, ethanol, and compounds represented by the general formula:

$$XCF_2-CYZ-X'$$

wherein:

X is selected from the group consisting of F, Cl, Br, and I;

X' is selected from the group consisting of Cl, Br, and I;

Y and Z are independently selected from the group consisting of H, F, Cl, Br, I and R';

R' is selected from the group of perfluoroalkyl radicals and chloroperfluoroalkyl radicals having from 1 to 6 carbon atoms.

The most preferred solvents or dispersants are 1,2-dibromotetrafluoroethane (commonly known as Freon 114 B 2)

$$BrCF_2-CF_2Br$$

and 1,2,3-trichlorotrifluoroethane (commonly known as Freon 113):

$$ClF_2C-CCl_2F$$

Of these two materials, 1,2-dibromotetrafluoroethane is the most preferred solvent or dispersant.

The solution or dispersion used to apply the binder to the foundation layer may be of a concentration of from about 2 to about 30 weight percent of polymer in the solvent/dispersant have been found to be acceptable. Preferably, the concentration is from about 8 to about 20 weight percent of polymer in the solvent/dispersant.

After the solution or dispersion has been applied to the foundation layer, the solvent can then be driven off using heat, vacuum, or a combination of heat and vacuum. Optionally, the solvent/dispersant may be allowed to evaporate under ambient conditions. Preferably, the solvent is removed by heat. In addition to removing the solvent/dispersant, the heat sinters the binder and causes it to more completely penetrate and surround the foundation layer. As an example, when polytetrafluoroethylene is used as the binder, exposure to about 300° to about 340° C. for about 20 minutes will suffice to remove the solvent/dispersant and to sinter the polytetrafluoroethylene.

The next step in the method of the present invention is the application of catalytically active particles to the coated foundation layer. The particles will, ultimately, constitute an electrode, when the article produced by the present method is used in an electrochemical cell.

The electrode is composed of a plurality of electrically conductive particles and can be ultimately used as either a cathode or as an anode.

Materials suitable for use as electrocatalytically active anode materials include, for example, activating substances such as metals or metal oxides of platinum group metals such as ruthenium, iridium, rhodium, platinum, palladium, either alone or in combination with an oxide of a film-forming metal such as Ti or Ta. Other suitable activating oxides include cobalt oxide either alone or in combination with other metal oxides such as those described in U.S. Pat. Nos. 3,632,498; 4,142,005; 4,061,549; and 4,214,971.

Materials suitable for use as electrocatalytically active cathode materials include, for example, platinum group metals or metal oxides, such as ruthenium or ruthenium oxide. U.S. Pat. No. 4,465,580 describes such cathodes.

The catalytic particles used in the present invention are preferably finely divided and have a preferred range of from about 280 to about 500 mesh size (U.S. Standard). The metal powder is applied to the binder-coated foundation layer by methods known to those skilled in the art including, for example, spraying, forming a sheet of catalytic particles and pressing the sheet onto the foundation layer, or by forming and applying the particles in the form of liquid dispersion, for example an aqueous dispersion. A suitable loading of catalyst particles has been found to be from about 0.2 to about 20 mg catalyst/cm$^2$ of foundation area with a preferred range of from about 1.5 to about 5.0 mg catalyst /cm$^2$ of foundation area.

Separately, a copolymer is formed. One such suitable polymer is the polymer formed from monomers I, II and optionally III as defined above. The polymer may be a thermoplastic, non-ionic precursor of a sulfonic acid copolymer or a thermoplastic, non-ionic precursor of a carboxylic acid copolymer, or a variety of other polymers as defined for use as the binder. Preferably, the copolymer is formed into a solution or a dispersion with a solvent for application to the catalytically active particles. On mixing with a suitable solvent or dispersant, the polymer is applied to the catalyst particle coated foundation layer. Utilizing vacuum on one side of the foundation layer, the polymer in the solvent or dispersant is pulled onto the catalyst, and into the foundation layer. While in one sense, it can be described as coated on one side, the coating nevertheless sufficiently penetrates into the porous sheet.

In the step of bonding a fluoropolymer onto the surface of the catalytic particle coated foundation layer, the most convenient procedure is the use of conventional organic solvents. Typical solvents used are 1,2-dibromotetrafluoroethane, methanol, ethanol, and the like. The polymeric material which is applied forms a substantially nonporous ion exchange layer.

The next step is the application of heat and/or pressure to remove the solvent/dispersant and to sinter the polymer, thereby forming the polymer into a substantially continuous sheet. In addition, the heat and or pressure enhance the coating of the polymer around the catalyst particles and the foundation layer. For example, exposure to temperatures in the range of from about 260° to about 320° Celsius are generally suitable to bond the polymer to the particles and the foundation layer. The temperature range is limited primarily by the onset of thermal degradation of the polymer caused by excessive heat. The pressure is preferably sufficiently high and sustained for an interval to achieve bonding. In one example, pressure may be applied up to about 5 kg/cm$^2$ for about one minute at elevated temperature.

The next step in the manufacture of the improved electrode structure is to hydrolyze the structure from the non-ionic to its ionic form. Hydrolysis may be accomplished by treating the polymer with a basic solution if the polymer is a thermoplastic, non-ionic precursor of a sulfonic acid polymer or a thermoplastic, non-ionic precursor of a carboxylic acid polymer. In addition, if the polymer is a thermoplastic, non-ionic precursor of a carboxylic acid polymer, an acid solution may be used to hydrolyze the polymer. For example, in a thermoplastic, non-ionic precursor of a sulfonic acid polymer, the completed structure may be hydrolyzed in 25% weight sodium hydroxide for 16 hours at an elevated temperature of 80° C.

The completed article is then ready for use. As an example of typical size, it is not uncommon to encounter a membrane which is in a range of 5 to 10 mils thick due to the need for structural integrity. The finished product of this disclosure can yield a membrane with a thickness in a range of 1 to 2 mils or even less. The resistance of ionic movement through the membrane is thus lowered by a significant amount.

In an alternate application two similar sheets of equal size are positioned in contact with one another in a manner so that the foundation layers face toward the outside of the combination and the polymer layer on each sheet is contacted against the polymer layer on the other sheet. The coterminous sheets are then placed into a press, and on the application of suitable pressure and/or heat they are joined together.

While the foregoing sets forth the preferred embodiment of manufacture and describes the membrane and electrode assembly obtained thereby, the scope of the present disclosure is determined by the claims which follows.

I claim:

1. A method for making an ion permeable membrane, electrode and current collector assembly comprising making two assemblies by following the steps of:
   (a) forming a foundation layer comprising a porous electrically conductive material;
   (b) at least partially coating a fluoropolymer binder on at least one surface of the conductive foundation layer;
   (c) applying a particulate and finely divided catalyst material over the floropolymer binder on the foundation layer;
   (d) dispersing a suitable polymeric material over the catalyst material in a manner to obtain penetration of the polymeric material into the porous foundation layer to form a substantially continuous coating on the catalyst material and the at least partially coated foundation layer; and
   (e) applying sufficient heat and/or pressure to enhance the flow of polymeric material into the foundation layer and around the catalyst material to obtain adherence thereto and to sinter the polymer material into a substantially nonporous layer around the catalyst material;
   (f) then, placing the two assemblies together such that the nonporous polymeric surfaces are in intimate contact with each other and applying heat and/or pressure to form a single planar membrane featuring two current collectors having a nonporous, ionically conductive polymer layer therebetween.

2. The method of claim 1 wherein the floropolymer is applied to the conductive foundation layer as a solution or dispersion.

3. The method of claim 2 wherein the solution or dispersion contains one or more solvents or dispersants selected from the group consisting of ethanol, methanol, water, and a compound represented by the general formula:

$$XCF_2\text{—}CYZ\text{—}X' \qquad (10)$$

wherein:
X is selected from the group consisting of F, Cl, Br, and I;
X' is selected from the group consisting of Cl, Br, and I;
Y and Z are independently selected from the group consisting of H, F, Cl, Br, I and R';
R' is selected from the group of perfluoroalkyl radicals and chloroperfluoroalkyl radicals having from 1 to 6 carbon atoms.

4. The method of claim 3 wherein the solvent or dispersant is 1,2-dibromotetrafluoroethane.

5. The method of claim 3 wherein the solvent or dispersant is 1,2,3-trichlorotrifluoroethane.

6. The method of claim 2 wherein the catalyst particles are selected from the group consisting of ruthenium, iridium, rhodium, platinum, palladium, or oxides thereof either alone or in combination with an oxide of a film-forming metal, cobalt oxide either alone or in combination with other metal oxides, and platinum group metal or metal oxide.

7. The method of claim 1 including the step of hydrolyzing the polymeric material in the assembly.

8. The method of claim 1 wherein said floropolymer binder for the foundation layer is a thermoplastic, non-ionic precursor of a sulfonic acid copolymer having an equivalent weight range of 500-2000.

9. The method of claim 1 wherein said floropolymer binder for the foundation layer is a thermoplastic, non-ionic precursor of a carboxylic acid copolymer.

10. The method of claim 1 wherein
    (a) said conductive material is porous conductive carbon paper;
    (b) said polymeric material is a sulfonic acid copolymer in thermoplastic powder form in a liquid solvent and vacuum is drawn to obtain penetration into the porous carbon paper.

11. The method of claim 7 including the step of exposing the polymeric material to a base at a temperature and for a time sufficient to hydrolyze substantially all of the polymeric material.

12. The method of claim 7 including the step of exposing the polymeric material to an acid at a temperature and for a time sufficient to hydrolyze substantially all of the polymeric material, where the polymeric material is a carboxylic acid polymer.

13. The method of claim 1 wherein the binder is polytetrafluoroethylene.

14. The method of claim 1 wherein the binder is a copolymer formed from the polymerization of one or more monomers selected from the group of monomers represented by the general formula:

$$CF_2\text{=}CZZ' \qquad (I)$$

where:
Z and Z' are independently selected from the group consisting of —H, —Cl, —F, or —CF$_3$; with one or more monomers selected from the group of monomers represented by the general formula:

$$Y\text{—}(CF_2)_a\text{—}(CFR_f)_b\text{—}(CFR_f')_c\text{—}O\text{—}[(CF(CF_2X)\text{—}CF_2\text{—}O]_n\text{—}CF\text{=}CF_2 \qquad (II)$$

where:
Y is selected from the group consisting of —SO$_2$Z, —CN, —COZ, and —C(R$^3$f)(R$^4$f) OH: Z is —I, —Br, —Cl, —F, —OR or —NR$_1$r$_2$;
R is a branched or linear alkyl radical having from 1 to about 10 carbon atoms or an aryl radical; R$^3$f and R$^4$f are independently selected from the group consisting of perfluoroalkyl radicals having from 1 to about 10 carbon atoms;
R$_1$ and R$_2$ are independently selected from the group consisting of —H, a branched or linear alkyl radical having from 1 to about 10 carbon atoms or an aryl radical;
a is 0-6;
b is 0-6;
c is 0 or 1;
provided a+b+c is not equal to 0;
X is —Cl, —Br, —F or mixtures thereof when n>1;
n is 0 to 6; and
R$_f$ and R$_f'$ are independently selected from the group consisting of —F, —Cl, perfluoroalkyl radicals having from 1 to about 10 carbon atoms and fluorochloroalkyl radicals having from about 1 to about 10 carbon atoms.

15. The method of claim 14 wherein the polymer also includes a third monomer selected from the group of monomers represented by the general formula:

$$Y'\text{—}(CF_2)_{a'}\text{—}(CFR_f)_{b'}\text{—}(CFR'_f)_{c'}\text{—}O\text{—}[CF(CF_2X')\text{—}CF_2\text{—}O]_{n'}\text{—}CF\text{=}CF_2 \qquad (III)$$

where:
Y' is —F, —Cl or —Br;
a' and b' are independently 0 -3;
c' is 0 or 1;
provided a'+b'+c' is not equal to 0;
n' is 0-6; R$_f$ and R'$_f$ are independently selected from the group consisting of —Br, —Cl, —F, perfluoroalkyl radicals having from 1 to about 10 carbon atoms, and chloroperfluoroalkyl radicals having from 1 to about 10 carbon atoms; and
X' is —F, —Cl, —Br, or mixtures thereof when n'>1.

16. The method of claim 15 wherein Y is —SO$_2$F or —COOCH$_3$; n is 0 or 1; R$_f$ and R$_f$ are —F; X is —Cl or —F; and a+b+c is 2 or 3.

* * * * *